(12) United States Patent
Kumar et al.

(10) Patent No.: US 12,498,034 B2
(45) Date of Patent: Dec. 16, 2025

(54) HELICAL CENTER DRIVE GEARBOX FOR ENCLOSING GEARBOX COMPONENTS

(71) Applicant: Valmont Industries, Inc., Omaha, NE (US)

(72) Inventors: Shobhit Kumar, Brookfield, WI (US); Steven C. Santelman, Elkhorn, NE (US); Benjamin J. Toman, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 154 days.

(21) Appl. No.: 18/363,122

(22) Filed: Aug. 1, 2023

(65) Prior Publication Data

US 2024/0049660 A1     Feb. 15, 2024

Related U.S. Application Data

(60) Provisional application No. 63/396,258, filed on Aug. 9, 2022.

(51) Int. Cl.
| | |
|---|---|
| *F16H 57/02* | (2012.01) |
| *A01G 25/09* | (2006.01) |
| *F16H 57/027* | (2012.01) |
| *F16H 57/029* | (2012.01) |

(52) U.S. Cl.
CPC ......... *F16H 57/029* (2013.01); *F16H 57/027* (2013.01); *A01G 25/092* (2013.01); *F16H 2057/02008* (2013.01); *F16H 2057/02034* (2013.01); *F16H 2057/02056* (2013.01)

(58) Field of Classification Search
CPC ................ F16H 57/027; F16H 57/029; F16H 2057/02008; F16H 2057/02034; F16H 2057/02056; A01G 25/092
See application file for complete search history.

(56) References Cited

U.S. PATENT DOCUMENTS

| | | | | |
|---|---|---|---|---|
| 3,422,982 A | * | 1/1969 | Myers | F16H 57/027 |
| | | | | 220/374 |
| 3,964,335 A | * | 6/1976 | Gerard | F16C 35/077 |
| | | | | 74/425 |

(Continued)

FOREIGN PATENT DOCUMENTS

| | | | |
|---|---|---|---|
| CN | 107740857 A | * | 2/2018 |
| CN | 107869554 A | * | 4/2018 |

(Continued)

OTHER PUBLICATIONS

Machine translation of CN 112377606 A obtained on Mar. 26, 2025.*

(Continued)

*Primary Examiner* — Adam D Rogers
(74) *Attorney, Agent, or Firm* — Milligan PC LLO

(57) ABSTRACT

A gearbox case which includes a gear cavity breather device contained within the gearbox case to allow pressure equalization between the interior gearbox cavity and the external environment, while ensuring lubricant is kept in the gearbox. According to a preferred embodiment, the breather device contained within gearbox case may be formed as a spring-loaded ball valve to ensure external contaminants are kept out of the gearbox while allowing air to pass.

8 Claims, 13 Drawing Sheets

(56) References Cited

U.S. PATENT DOCUMENTS

| | | | | |
|---|---|---|---|---|
| 5,125,428 | A * | 6/1992 | Rauter | F01M 13/04 |
| | | | | 210/188 |
| 5,205,848 | A * | 4/1993 | Blanc | B01D 46/0087 |
| | | | | 55/498 |
| 6,840,137 | B2 * | 1/2005 | Kaplan | F16H 57/027 |
| | | | | 74/606 R |
| 7,025,175 | B1 * | 4/2006 | Pate | F16H 57/027 |
| | | | | 137/554 |
| 8,826,774 | B1 * | 9/2014 | Craig | F16H 57/027 |
| | | | | 74/606 R |
| 10,697,532 | B2 * | 6/2020 | Schleif | F16H 57/031 |
| 10,760,669 | B2 * | 9/2020 | Herzel | F16H 57/02 |
| 2004/0226766 | A1 | 11/2004 | Cook et al. | |
| 2006/0170165 | A1 | 8/2006 | Meyer | |
| 2006/0213318 | A1 | 9/2006 | Hibbler et al. | |
| 2007/0193408 | A1 * | 8/2007 | Martinez | A01D 34/30 |
| | | | | 74/609 |
| 2016/0160961 | A1 | 6/2016 | Biro et al. | |
| 2017/0335923 | A1 | 11/2017 | Smith et al. | |
| 2019/0283577 | A1 * | 9/2019 | Bordwell | F16H 57/029 |

FOREIGN PATENT DOCUMENTS

| | | | | |
|---|---|---|---|---|
| CN | 207661068 U | | 7/2018 | |
| CN | 112049910 A | * | 12/2020 | |
| CN | 112377606 A | | 2/2021 | |
| CN | 112503141 A | * | 3/2021 | |
| DE | 102007043462 B3 | * | 2/2009 | F16H 57/027 |
| EP | 0155115 A2 | * | 9/1985 | |
| KR | 20110100798 A | * | 9/2011 | |
| KR | 20210017725 A | * | 2/2021 | |
| KR | 20230105119 A | * | 7/2023 | |

OTHER PUBLICATIONS

Machine translation of KR 20110100798 A obtained on Mar. 26, 2025.*

Viton; Customize Your Static Seal Performance with the Right Elastomer; https://www.viton.com/en/applications/static-seals.*

International Application PCT/US23/71403, International Search Report and Written Opinion mailed Jan. 30, 2024, 10 pages.

* cited by examiner

HELICAL CENTER DRIVE GEARBOX FOR ENCLOSING GEARBOX COMPONENTS

RELATED APPLICATIONS

The present application claims priority to U.S. Provisional Application No. 63/396,258 filed Aug. 9, 2022.

BACKGROUND AND FIELD OF THE PRESENT INVENTION

Field of the Present Invention

The present invention relates generally to irrigation machines and, more particularly, to a gearbox for enclosing gearbox components.

BACKGROUND OF THE INVENTION

FIG. 1 illustrates an exemplary self-propelled irrigation system 100 as known in the prior art. As shown, common self-propelled irrigation systems 100 generally may include spans 102, 104 supported by drive towers 108, 110. Further, such irrigation machines 100 may generally include a movable corner section 106 which may include an end gun (not shown).

In operation, the self-propelled towers of the irrigation machines are driven by drive motors attached to the wheels of each tower. Each drive motor usually includes an attached gearbox to translate torque from the drive motors to the wheels. FIG. 2 provides a prior art example of gearboxes as taught in U.S. Pat. No. 3,954,120 to Zimmer. As shown in FIG. 2, each drive tower 200 generally may include framing/bracing arms 201-203 and a drive system including a drive motor 222, one or more motor gearboxes 224 and one or more drive shafts 206, 208 to provide torque to one or more drive wheels 204. As further shown, the torque from each drive shaft 206, 208 may be translated ninety-degrees via one or more wheel gearboxes 210. Each wheel gearbox 210 may include a gearbox housing 212 and a gearbox cover 214 secured by cap screws 216. The drive wheels 204 may be attached to each wheel flange 220 via bolts/bolt holes 218.

For each system of the prior art, numerous limitations exist. In particular, each solution of the prior art may permit both oil leakage and water intrusion under certain circumstances. In order to overcome the limitations of the prior art, a system is needed which is able to effectively provide ventilation for an irrigation system gearbox during irrigation operations and which improves seal life and reduces oil leakage.

SUMMARY OF THE DISCLOSURE

To minimize the limitations found in the prior art, and to minimize other limitations that will be apparent upon the reading of the specifications, the present invention teaches an exemplary gearbox case which includes a gear cavity breather device contained within the gearbox case to allow pressure equalization between the interior gearbox cavity and the external environment, while ensuring lubricant is kept in the gearbox. According to a preferred embodiment, the breather device contained within gearbox case may be formed as a spring-loaded ball valve to ensure external contaminants are kept out of the gearbox while allowing air to pass.

According to a further preferred embodiment, a first exemplary gearbox is taught which includes a gearbox cover and gearbox case attached together with a central seal. According to a further embodiment, the gearbox case preferably includes an upper wall surface between two gearbox corners. According to a further embodiment, the first exemplary gearbox includes a gear cavity breather extending through the upper wall surface of the gearbox case and located between the two gearbox corners.

According to a further preferred embodiment, the central seal is formed of an O-ring installed in between the gearbox cover and the gearbox case. Preferably, the central seal has a rectangular cross-section. Alternatively, the central seal may have a round cross-section or may have any of a number of other geometries. Preferably, the central seal is formed of flexible material such as nitrile butadiene rubber (NBR), fluoroelastomers (FKM/FPM) or the like.

DESCRIPTION OF THE PREFERRED EMBODIMENTS

Aspects of the present invention will be explained with reference to exemplary embodiments and examples which are illustrated in the accompanying drawings. These descriptions, embodiments and figures are not to be taken as limiting the scope of the claims. Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

As used herein, the singular forms "a," "an" and "the" are intended to include the plural forms as well, unless the context clearly indicates otherwise. Additionally, the word "may" is used in a permissive sense (i.e., meaning "having the potential to'), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
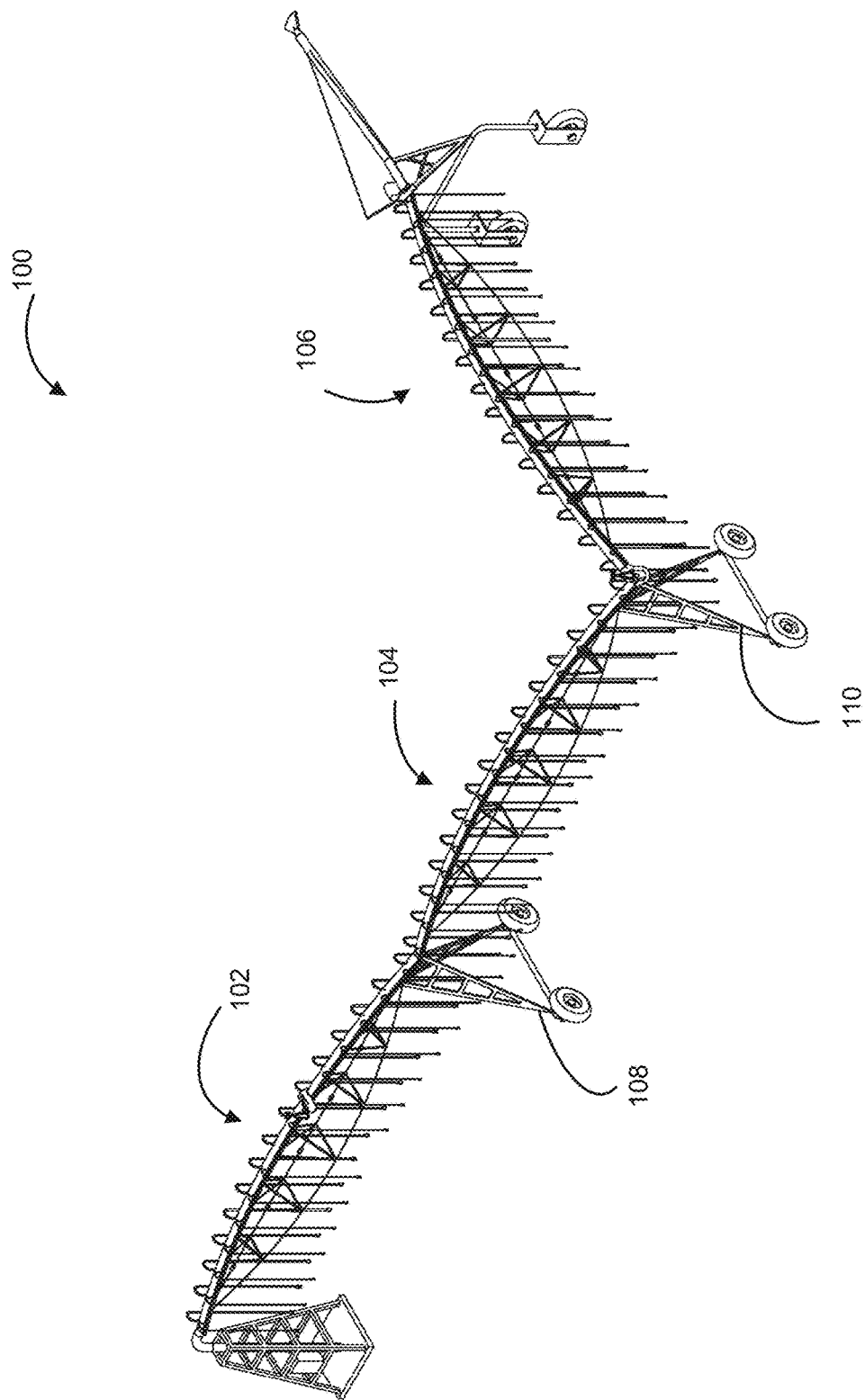
FIG. 1 is an illustration of an exemplary irrigation machine in accordance with the prior art.
Figure 2:
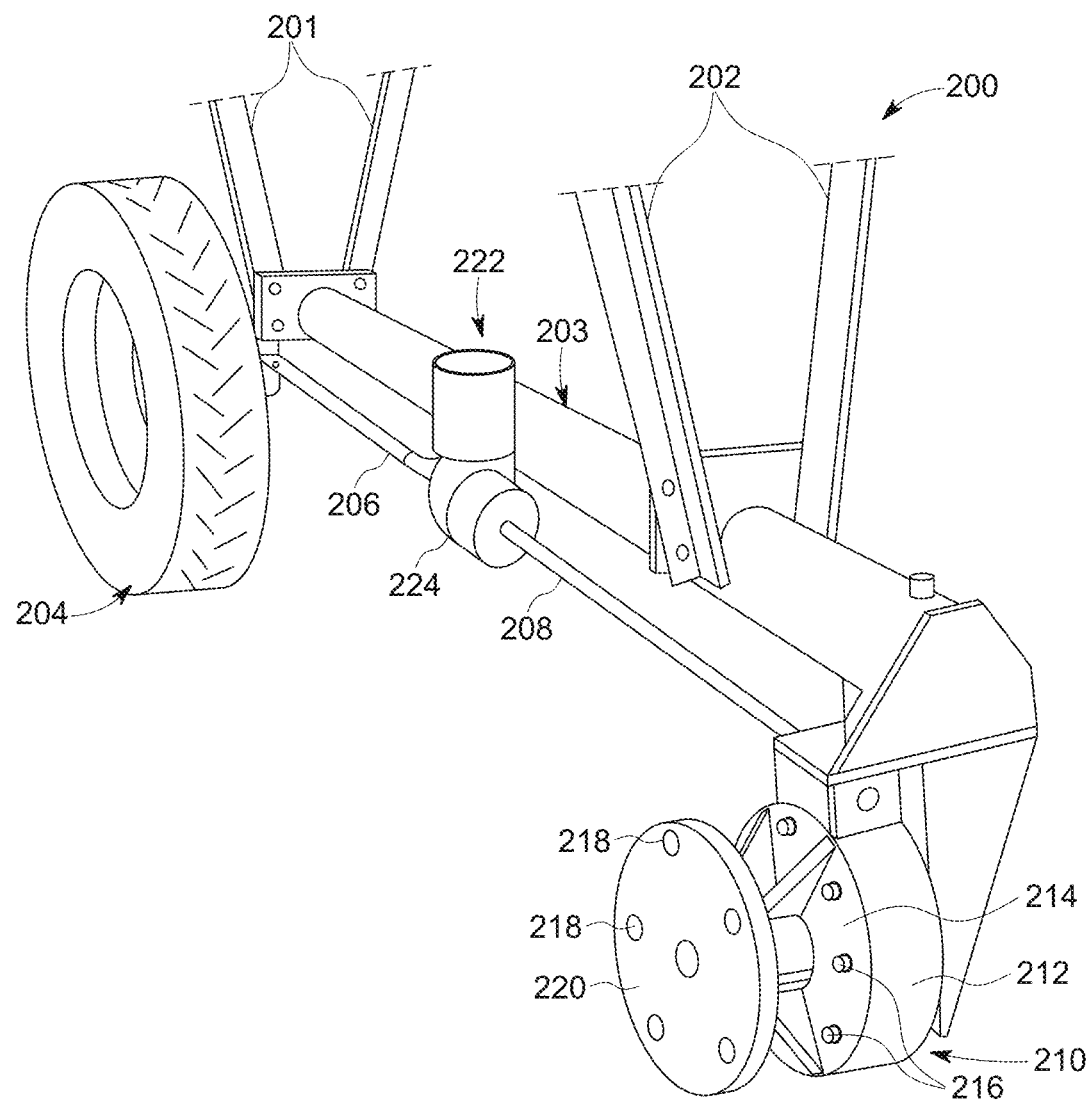
FIG. 2 shows a perspective view of an exemplary drive tower as known in the prior art.
Figure 3:
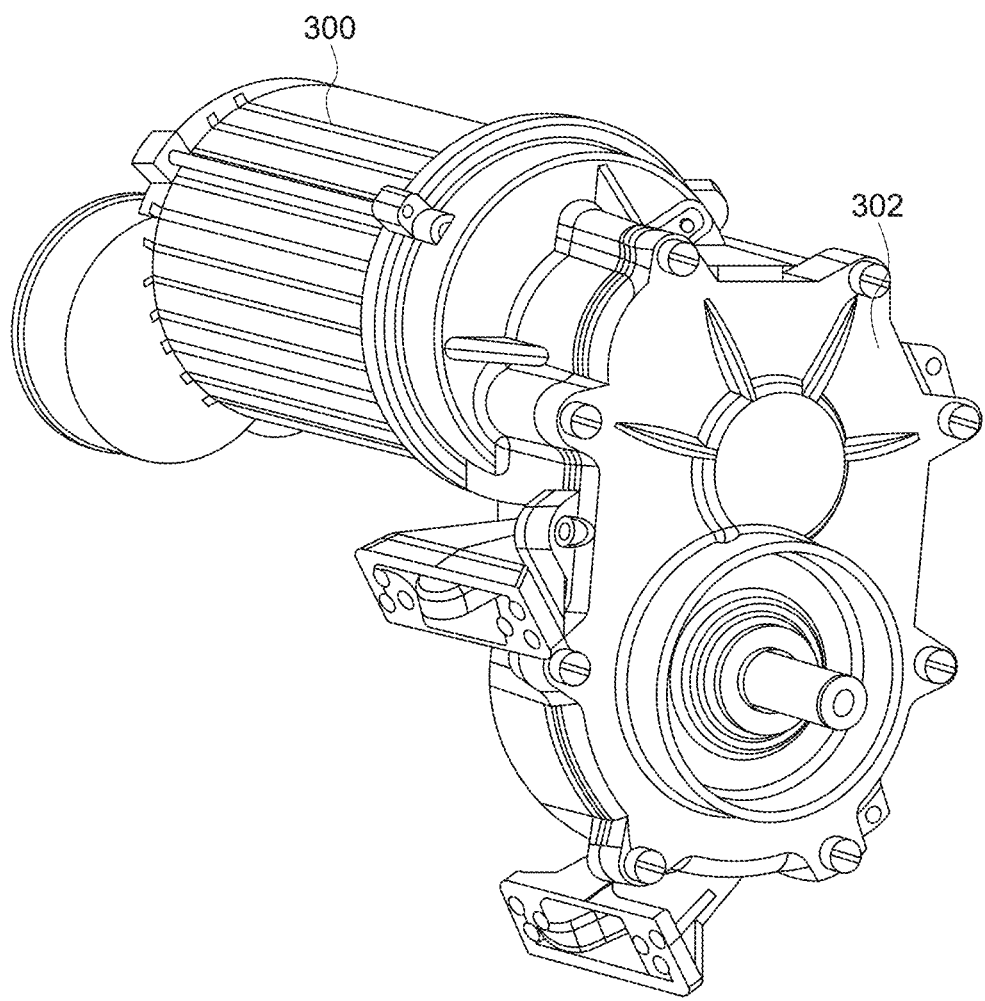
FIG. 3 is a perspective view of a helical center drive gear module/train for an irrigation machine in accordance with a preferred embodiment of the present invention.

FIG. 3 is a perspective view of a helical center drive gear module/train for an irrigation machine in accordance with a preferred embodiment of the present invention. As shown, the example motor 300 can be any type of motor without limitation. The gearbox 302 will be discussed further below.

Figures 4A, 4B:
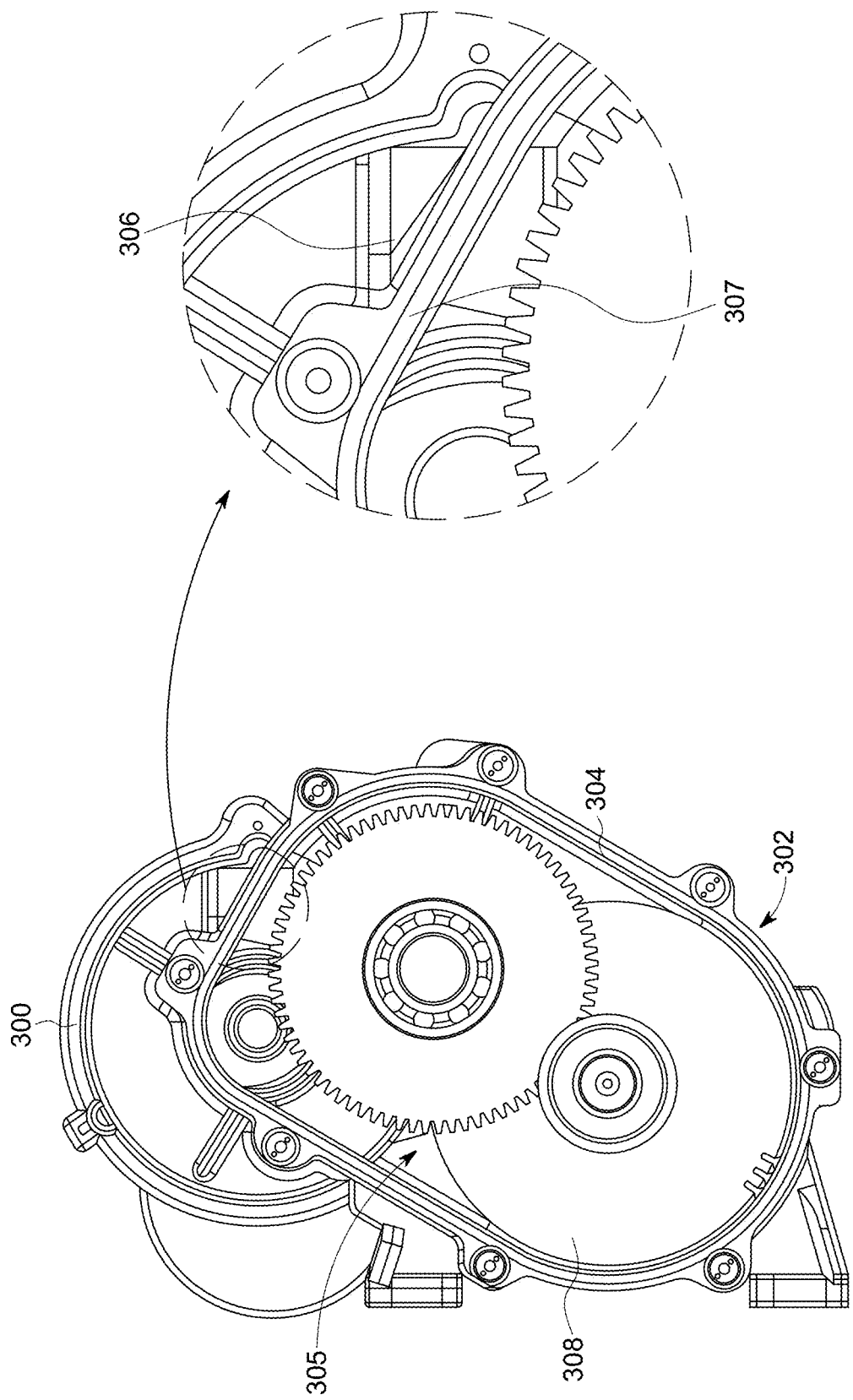
FIGS. 4A and 4B are side cut-away views of the exemplary helical center drive gear module/train shown in FIG. 3.
Figure 5:
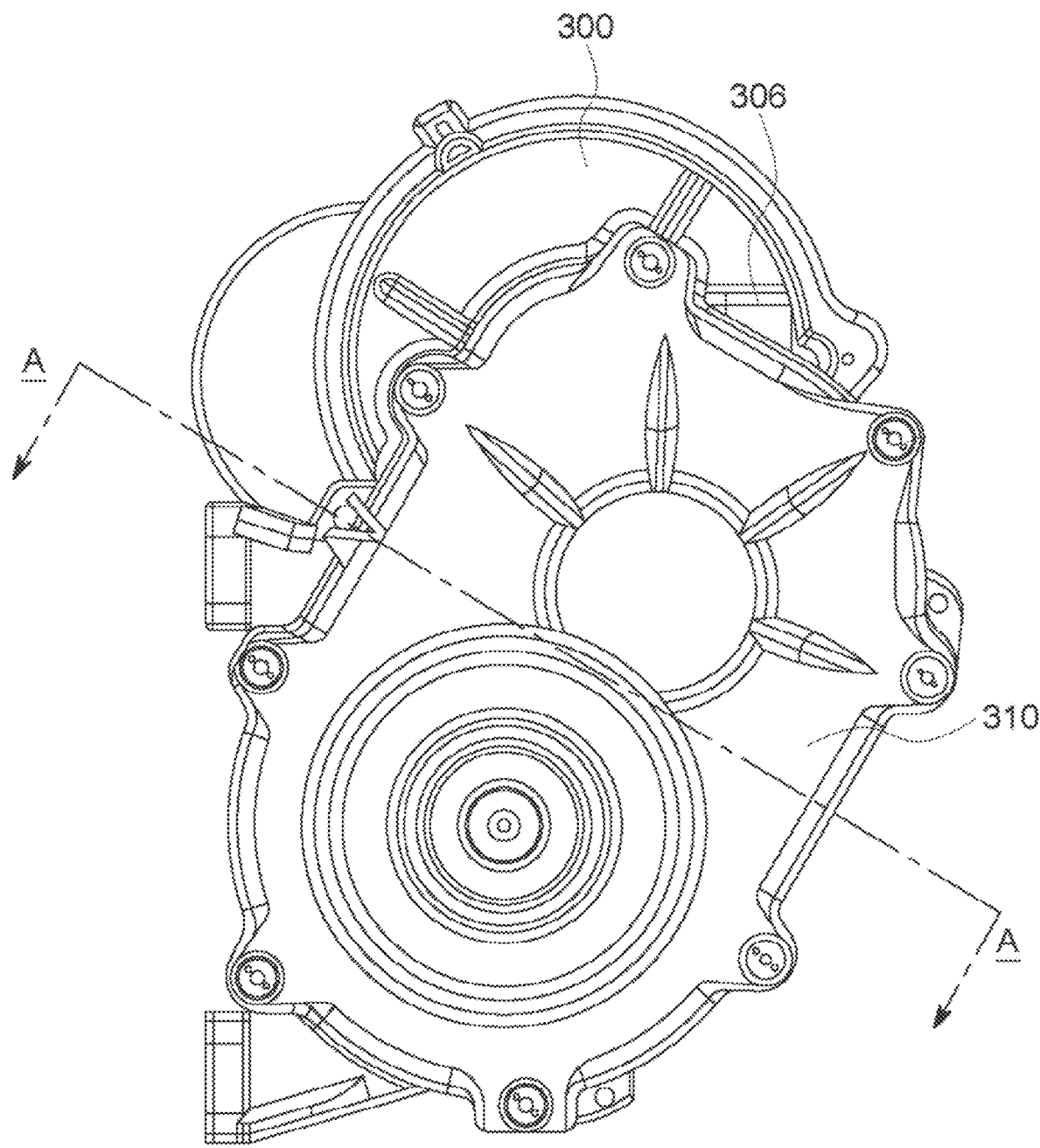
FIG. 5 is a front perspective view of the drive module shown in FIG. 4.

Referring now to FIGS. 4A and 4B, side cut-away views of the exemplary helical center drive gear module/train shown in FIG. 3 are provided. As shown in FIG. 4A, a motor 300 is shown attached to the gearbox 302. As shown, the gearbox 302 contains gears 308 for transferring torque between drive elements as discussed above. As shown, the gears 308 are contained within a gearbox case 304 defining a gearbox cavity 305 which is then covered by a gearbox cover 310 (shown in FIG. 5).

FIG. 4B is an enlarged view of the exemplary gear cavity 305 including a mounting boss 306 formed in the gearbox case 304 for accommodating a breather device (not shown) of the present invention within the gearbox case 304. According to preferred embodiments, the exemplary gear cavity breather device contained within the gearbox case 304 preferably allows pressure equalization between the gearbox cavity 305 and the external environment, while ensuring lubricant is kept in the gearbox 304. At the same time, the gear cavity breather preferably keeps contaminants and water out of the gear cavity 305. As shown, the mounting boss 306 formed in the gearbox case 304 is preferably formed to allow a contained breather device to extend through the upper wall 307 of the gearbox case 304.

According to a preferred embodiment, the breather contained within gearbox case 304 may be formed as a spring-loaded ball valve (as discussed further below) to ensure external contaminants are kept out of the gearbox while allowing air to pass, thus resulting in pressure equalization. Alternatively, the breather may be any other type of breather device without limitation. For example, the breather used with the present invention may be a labyrinth type breather system. Still further, the breather may be a Gore-Tex® type fabric barrier system, or similar. Additionally, the breather system of the present invention may include a screw-in cartridge, a diaphragm type system or the like.

Figure 11:
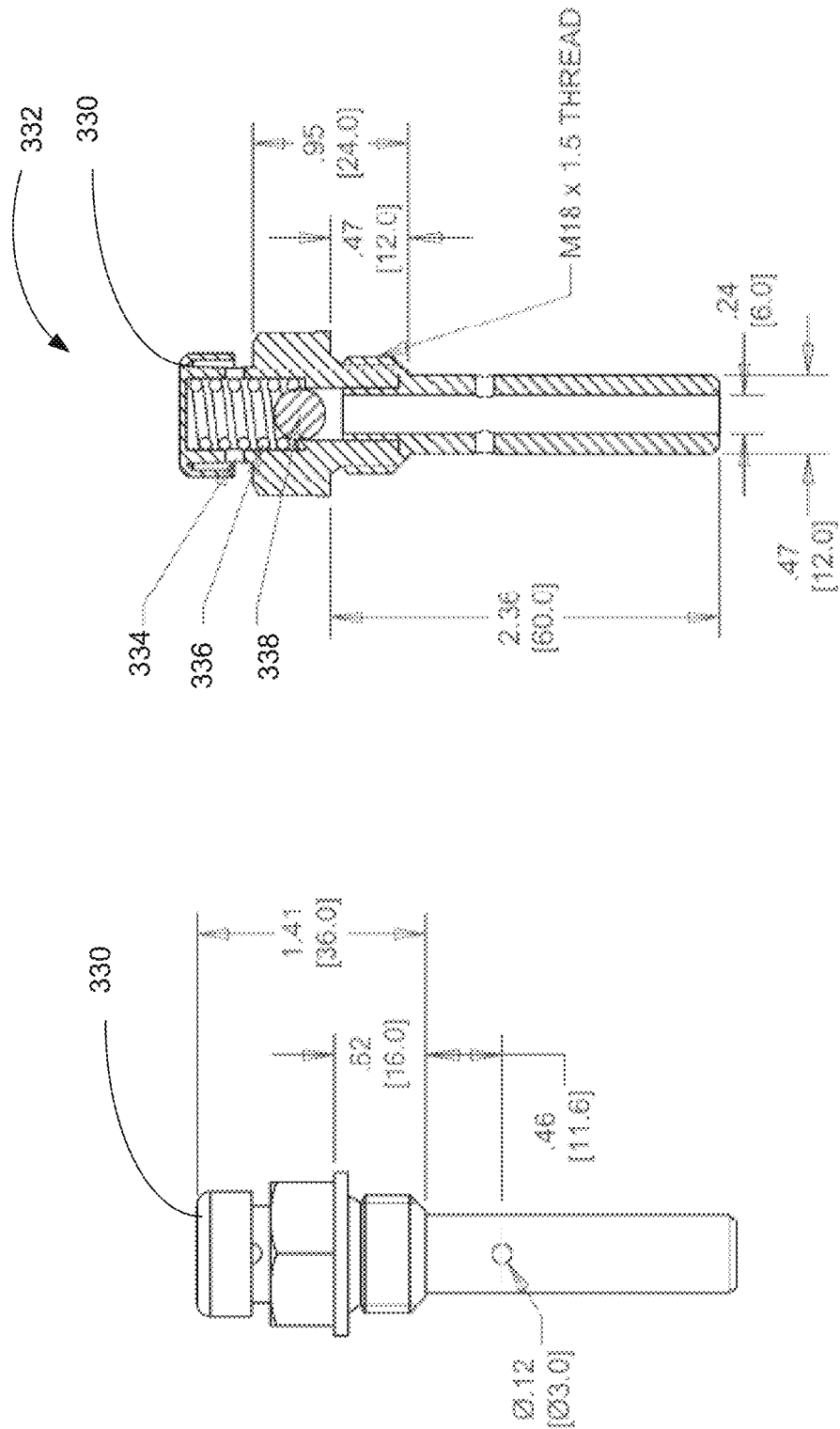
FIG. 11A is a side-view of an exemplary steel ball valve type breathing apparatus for use with the present invention.
FIG. 11B is a side cut-away view of the breather shown in FIG. 11A

According to a further preferred embodiment, a breather for use with the present invention may be a steel ball valve type breather valve 330 as shown in FIGS. 11A and 11B. FIG. 11A shows a side-view of an exemplary breather valve 330 which may preferably be used with the present invention. FIG. 11B shows a further side cut-away view 332 illustrating the exemplary internal components of the breather valve 330. As shown, such internal components may include an air output channel 334, a spring 336 and a ball 338 for controlling internal gearbox pressures.

Figure 6:
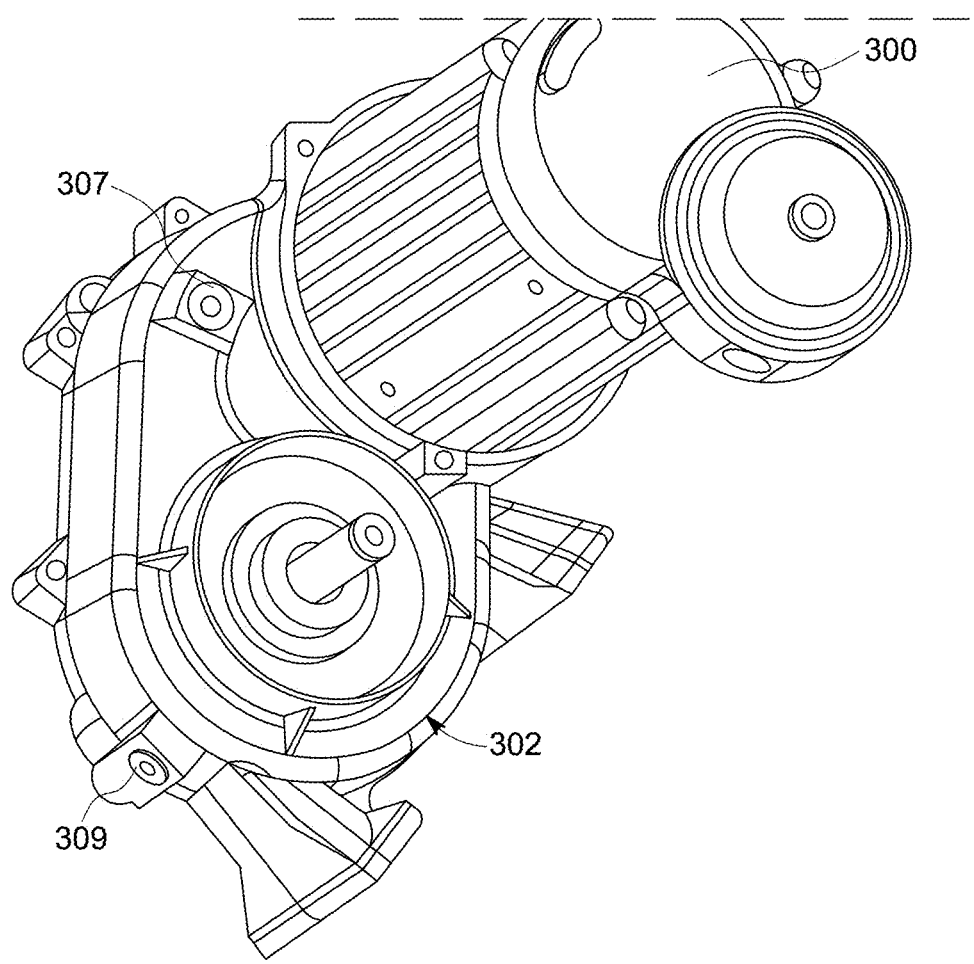
FIG. 6 shows a rear perspective view of the exemplary helical center drive module shown in FIG. 5.

FIG. 6 shows a rear perspective view of the exemplary helical center drive module shown in FIG. 3. As shown in FIG. 6, the gearbox 302 of the present invention preferably includes a sensor port 307 on the rear face of the gearbox housing 302. According to preferred embodiments, the sensor port 307 may accommodate and include one or more of a number of sensor types to monitor the gearbox 302. For example, the sensor port 307 may include a magnetic sensor for implementing a magnetic braking mechanism. Alternatively, the sensor may be a temperature sensor, an oil level sensor, a pressure sensor and/or the like. Preferably, a drain plug 309 (e.g., such as an M16 drain plug or the like) may further be placed on an outside wall of the gearbox 302.

Figure 7:
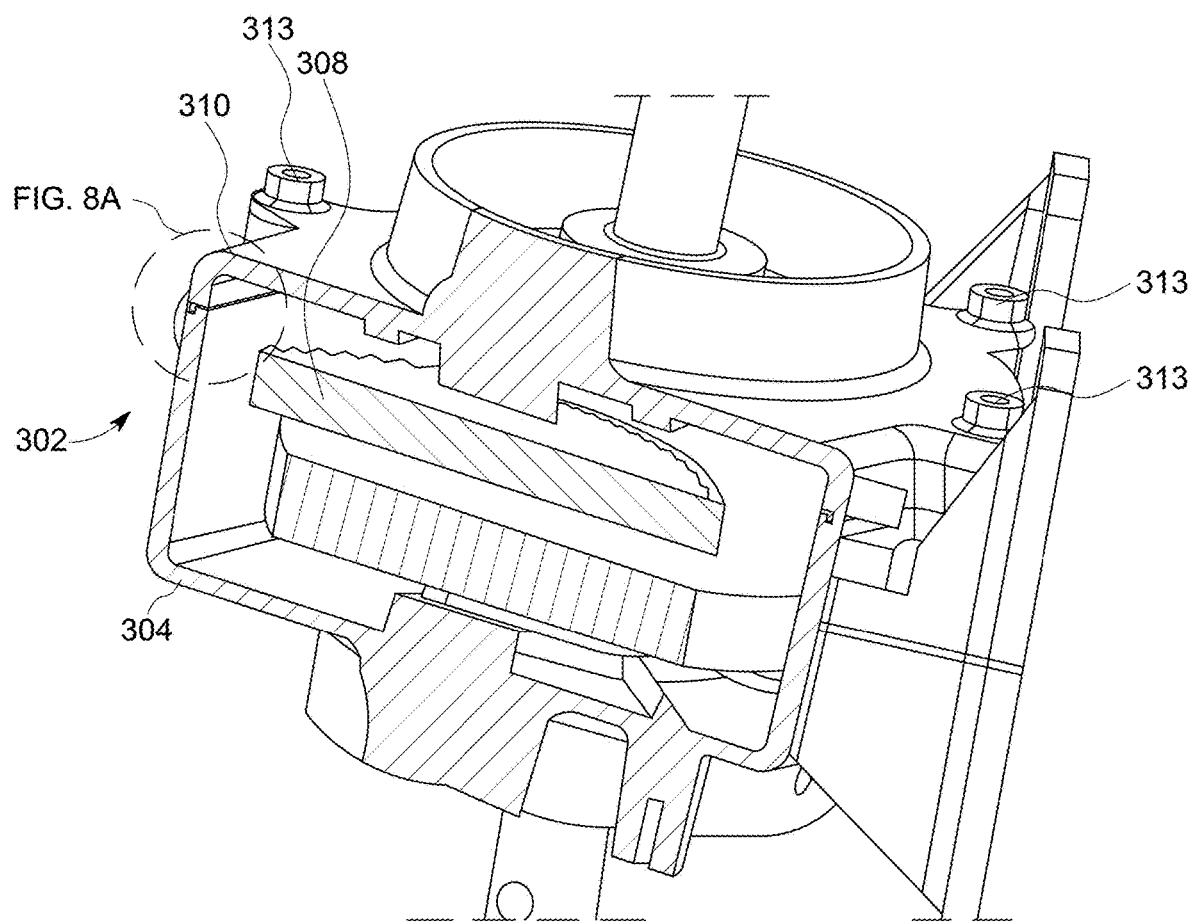
FIG. 7 is a side, perspective cut-away view of the drive module shown in FIG. 5, cut along line A-A as illustrated in FIG. 5.

With reference now to FIGS. 7-10, a preferred method and arrangement for sealing the gearbox front cover 310 to the main gearbox case 304 shall now be discussed. FIG. 7 provides a side, perspective cut-away view of the drive module shown in FIG. 5, cut along line A-A. FIGS. 8A and 8B provide enlarged views of the area indicated in FIG. 7.

Figures 8A, 8B:
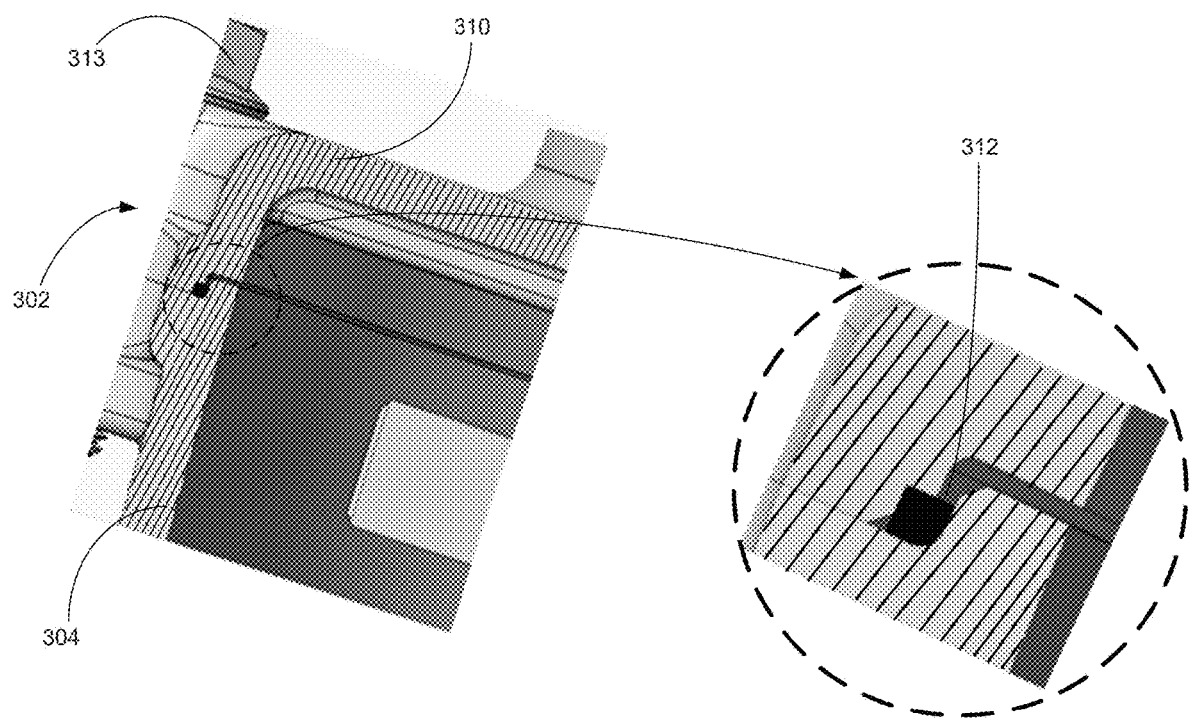
FIGS. 8A and 8B are enlarged views of the drive module shown in FIG. 7 showing a gearbox seal of the present invention.

The gearbox front cover 310 is shown attached to the gearbox case 304 via a plurality of securing bolts 313. As shown in FIGS. 8A and 8B, a flexible seal 312 is preferably used to secure and seal the gearbox front cover 310 and the gearbox case 304. Preferably, the gearbox front cover 310 and the gearbox case 304 are machined with interlocking geometry to ensure alignment of the cover and gearbox case, and to properly position the cover thereby ensuring the flexible seal 312 is seated correctly and protecting against possible oil leakage. In particular, the cover 310 of the present invention is preferably designed to ensure proper alignment of the gears, bearings, shafts and seals during assembly of the completed gearbox. Further, the cover is formed to increase the structural integrity of the gearbox.

The flexible seal 312 of the present invention is preferably provided by an O-ring installed in between the upper cover 310 and the lower gearbox case 304. According to a preferred embodiment, the flexible seal 312 of the present invention may preferably have a rectangular/square cross-section and may preferably be formed of nitrile butadiene rubber (NBR), fluoroelastomers (FKM/FPM) and/or the like.

Figure 9B:
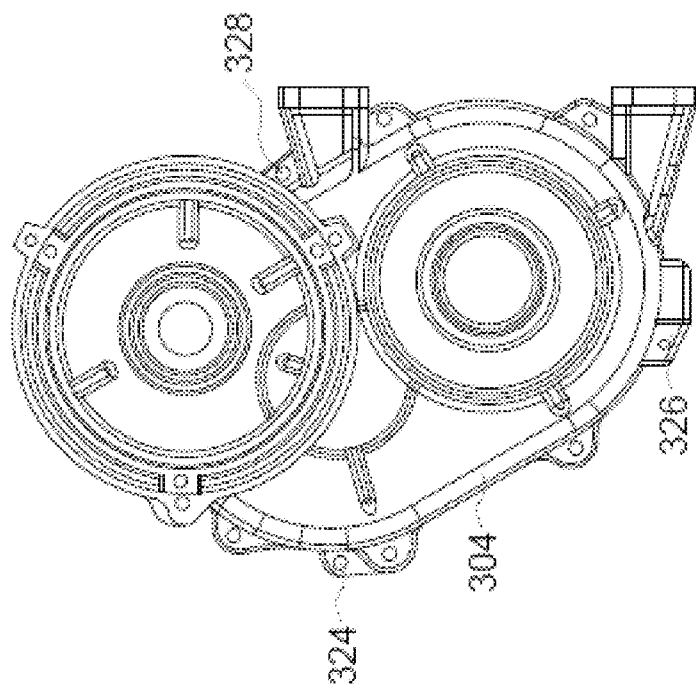
FIG. 9B is a rear view of an exemplary gearbox case attached to the gearbox cover of FIG. 9A.
Figure 9A:
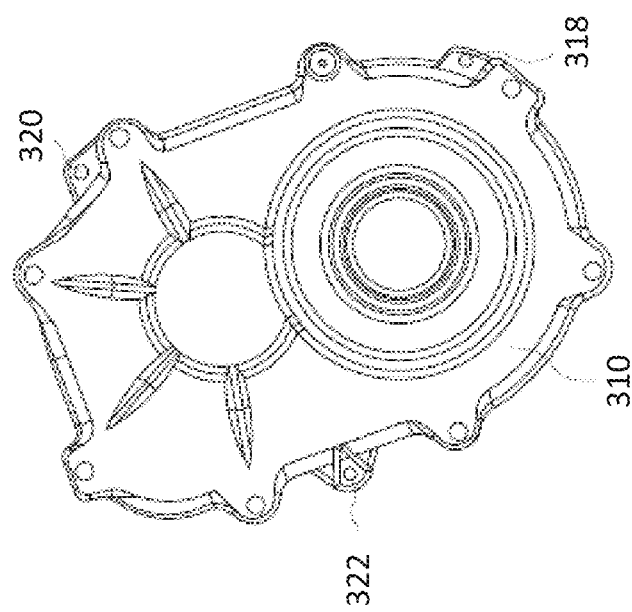
FIG. 9A is a front view of an exemplary gearbox cover in accordance with embodiments of the present invention.
Figure 10:
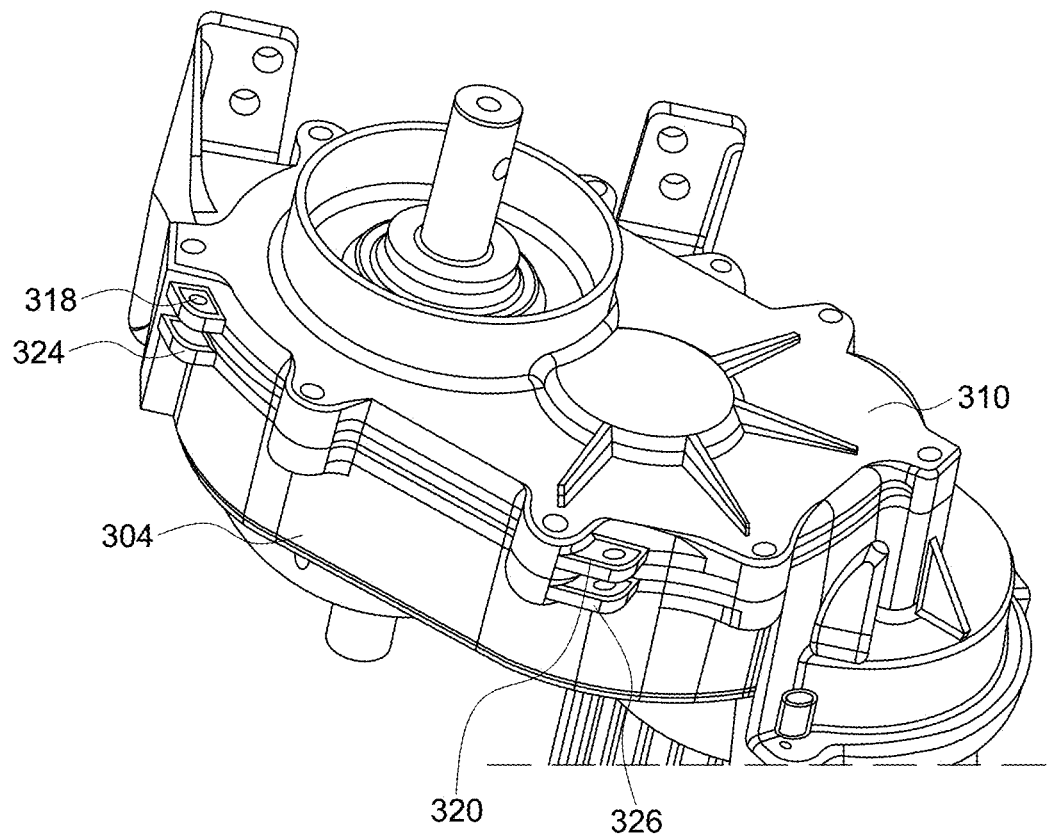
FIG. 10 is a side perspective view of the gearbox case shown FIG. 9B.

With reference now to FIGS. 9A, 9B and 10, further aspects of the present invention shall now be further discussed. In particular, the gearbox case 304 and front cover 310 of the present invention may preferably include selectively located pry tabs. As shown, an upper, cover pry tab 320 may preferably be located to align with the lower, gearbox case pry tab 324 when the cover 310 is attached to the lower gearbox case 304. Additionally, a second upper cover pry tab 318 is preferably located to align with a second lower, gear box pry tab 326 when the cover 310 is attached to the lower gearbox case 304. Likewise, a third gearbox cover pry tab 322 may be located to align with a third lower gearbox case pry tab 328.

Figure 12:
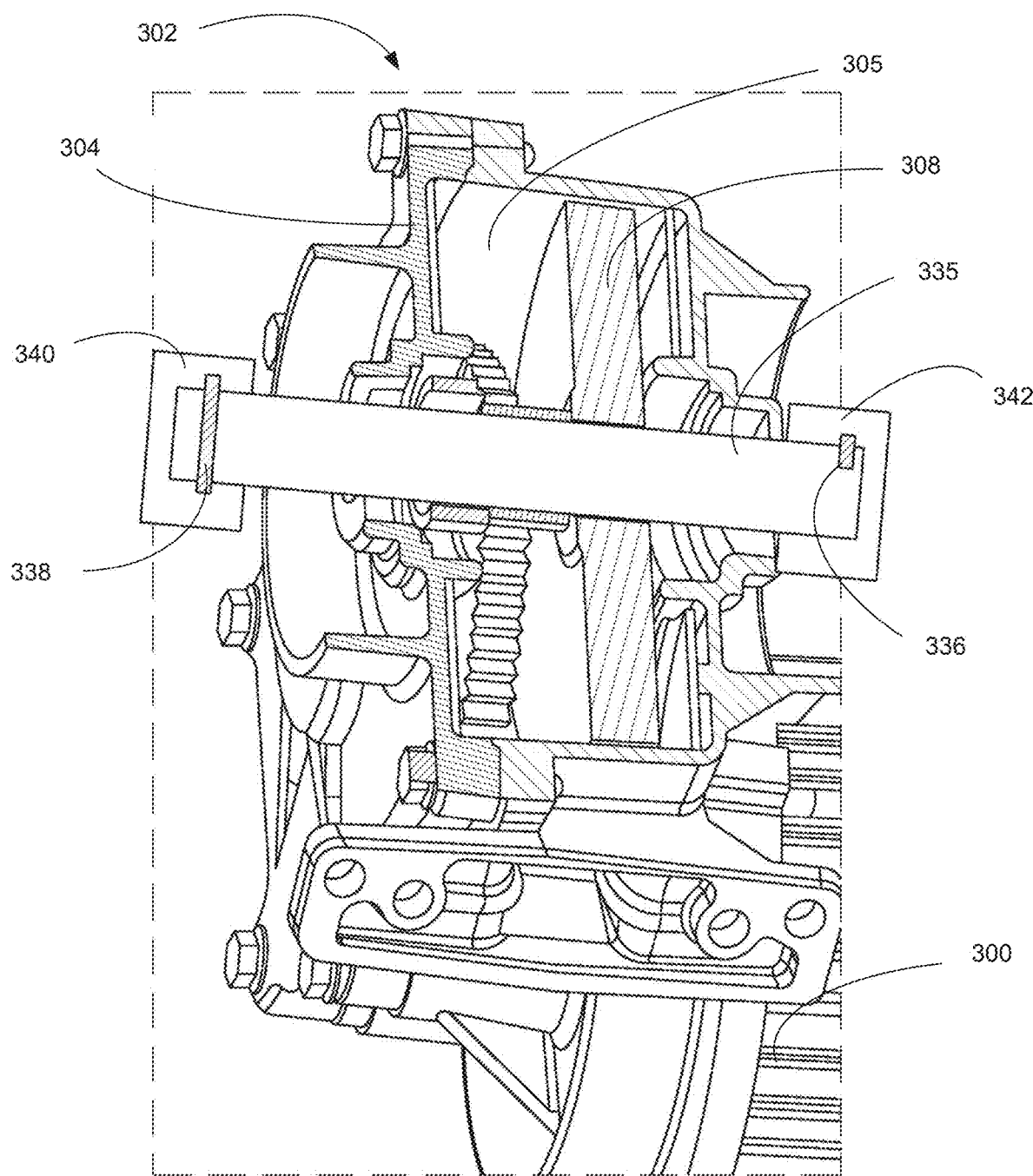
FIG. 12 is a side cut-away view of a gearbox assembly of the present invention showing the gearbox output shaft attached with a shearing cross bolt.
Figure 13:
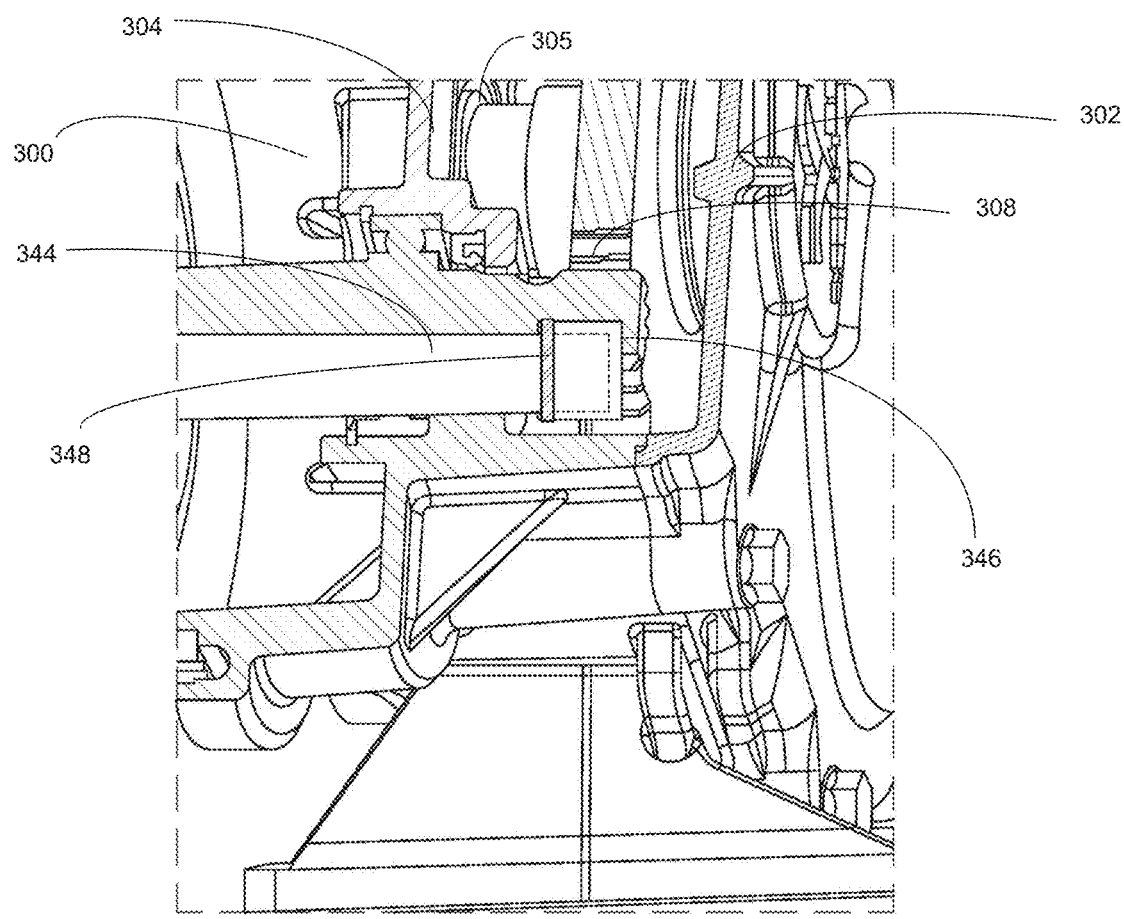
FIG. 13 is a side cut-away view of a gearbox assembly of the present invention showing the gearbox input shaft.

Referring now to FIGS. 12 and 13, the gearbox 302 of the present invention preferably further includes torque overload protection to protect components of the gearbox 302 and any other components within or attached to the drive train (e.g., U-joints, opposite wheel gearbox, center-drive gearbox, center-drive motor). For example, as shown in FIG. 12, the output shaft 335 (e.g., output shaft to connecting driveshaft or flexible joint) of the gearbox 302 may include a shearing cross bolt 338 which may preferably be attached to an axel hub 340, 342 or the like. As further shown in FIG. 12, a shearing key 336 or the like may be used in place of the shearing cross bolt 338. Alternatively, the output shaft 335 may be segmented with at least one segment of the output shaft 335 attached via a shearing cross bolt 338, shearing key 336 or the like. As shown in FIG. 13, these same torque protection measures may be integrated into the input shaft 344 (e.g., motor rotor to pinion joint) of the gearbox 302. For example, as shown in FIG. 13, the input shaft 344 may include a shearing key or shearing cross bolt 348 to secure the input shaft 344 to a pinion hub 346 or another segment of the input shaft 344.

The scope of the present invention should be determined not by the embodiments illustrated, but by the appended claims and their legal equivalents.

What is claimed is:

1. In a mechanized system having at least a first drive motor connected to a drive shaft;
    wherein the drive shaft is connected to at least one drive wheel via a first gearbox linked to the drive motor;
    the first gearbox comprising:
        a helical center drive gear train;
        a gearbox case defining a central gearbox cavity and enclosing the helical center drive gear train;
        a gearbox front cover; wherein the gearbox front cover is attached to the gearbox case using a plurality of securing bolts;
        a central seal, wherein the central seal comprises a flexible seal between the gearbox front cover and the gearbox case;
        wherein the central seal comprises a rounded rectangular cross-section; and
    a gear cavity breather, wherein the gear cavity breather extends through an upper wall surface of the gearbox case;
    wherein the gear cavity breather is configured to equalize pressure between the gearbox cavity and an external environment;
    wherein the gear cavity breather comprises a steel ball valve-type breather valve; wherein the steel ball valve-type breather valve comprises an air output channel, a spring and a ball for controlling internal gearbox pressures;
    wherein the gearbox comprises a sensor and a sensor port for monitoring the interior of the gearbox;
    wherein the sensor is selected from the group of sensors comprising: a magnetic sensor, a temperature sensor, an oil level sensor and a pressure sensor;
    wherein the gearbox comprises a drain plug on the outside wall of the gearbox;
    wherein the gearbox front cover and the gearbox case are machined with interlocking geometry;
    wherein at least one of the gearbox case and the gearbox front cover comprises pry tabs.

2. The gearbox of claim 1, wherein the pry tabs comprise a first gearbox front cover pry tab and a first gearbox case pry tab; wherein the first gearbox front cover pry tab is located to align with the first gearbox case pry tab when the gearbox front cover is attached to the gearbox case.

3. The gearbox of claim 2, wherein the pry tabs further comprise a second gearbox front cover pry tab and a second gearbox case pry tab; wherein the second gearbox front cover pry tab is located to align with the second gearbox case pry tab when the gearbox front cover is attached to the gearbox case.

4. The gearbox of claim 3, wherein the pry tabs further comprise a third gearbox front cover pry tab and a third gearbox case pry tab; wherein the third gearbox front cover pry tab is located to align with the third gearbox case pry tab when the gearbox front cover is attached to the gearbox case.

5. The gearbox of claim 4, wherein the gearbox further comprises an output shaft connected to a first drive train component; wherein the output shaft is secured to the first drive train component with a shearing cross bolt.

6. The gearbox of claim 4, wherein the gearbox further includes an input shaft connected to a second drive train component; wherein the input shaft is secured to the second drive train component with a shearing cross bolt.

7. The gearbox of claim 1, wherein the central seal is formed of nitrile butadiene rubber (NBR).

8. The gearbox of claim 1, wherein the central seal is formed of a fluoroelastomer.

* * * * *